United States Patent [19]

Maekawa et al.

[11] Patent Number: 4,705,389
[45] Date of Patent: Nov. 10, 1987

[54] METHOD FOR BOTH-SIDE COPYING AND APPARATUS THEREFORE

[75] Inventors: Yoshikazu Maekawa; Susumu Okui, both of Hachioji, Japan

[73] Assignee: Konishiroku Photo Ind. Co., Ltd., Tokyo, Japan

[21] Appl. No.: 899,215

[22] Filed: Aug. 21, 1986

[30] Foreign Application Priority Data

Aug. 26, 1985 [JP] Japan .................................. 60-185926
Oct. 7, 1985 [JP] Japan .................................. 60-221867

[51] Int. Cl.⁴ ........................ G03B 27/32; G03B 27/52
[52] U.S. Cl. .................................. 355/26; 355/14 SH; 355/77
[58] Field of Search .................. 355/3 SH, 14 SH, 26, 355/77

[56] References Cited

U.S. PATENT DOCUMENTS

4,536,078 8/1985 Ziehm ............................ 355/14 SH
4,592,651 6/1986 Oikawa et al. ............. 355/14 SH X
4,639,126 1/1987 Bushaw et al. ................ 355/24 X Primary Examiner—Richard A. Wintercorn
Attorney, Agent, or Firm—Frishauf, Holtz, Goodman & Woodward

[57] ABSTRACT

A method and an apparatus for copying images printed on both sides of a document onto both sides of copy sheets uses an automatic document conveying device capable of reversing the side of a document to be copied. Also disclosed is a the resuming method of a copying operation after removing a jammed sheet during the reverse side copying step of the both-sided document and the delivering method of the both-sided document when the copying operation is cancelled.

13 Claims, 4 Drawing Figures

METHOD FOR BOTH-SIDE COPYING AND APPARATUS THEREFORE

BACKGROUND OF THE INVENTION

The present invention relates to a method for both-side copying wherein the desired number of copies can be made even when copy sheets are jammed while copying the reverse side of a document having images on its both sides.

When copying a plurality of documents on many of the conventional copying machines, a user is required to place a document on a document glass plate one by one for replacement and it is a tough job to keep standing for the replacement of documents especially when the number of documents is large. Recently, therefore, there has been developed and has been put to practical use an automatic document feeding device wherein the plural documents stacked and positioned at a prescribed location can be conveyed one by one automatically onto the document glass plate and copied.

Among documents, incidentally, there are many of so-called both-side documents which have information desired to be copied on both sides thereof and an automatic document feeding device that can be used even for such both-side documents has been developed. In such automatic document feeding device for the both-side document, one side of the document is copied and then the document is turned upside down for copying its reverse side and is delivered, thus the documents are delivered in succession after being copied for both sides. Hereinafter, the first side of the document firstly copied is called as a obverse side and the second side of the document secondly copied is called as a reverse side. When a sheet jamming of a copy sheet (so-called a jam) takes place inside a copy machine while copying the reverse side of the both-side document onto the copy sheet in the copy machine employing aforesaid automatic document feeding device of a document-turnover type capable of reversing the side of document to be copied, it is necessary to clear the jam such as removing the jammed sheet and to continue producing the remaining copies for desired number of copies and then place the document manually on the document glass plate again to make copies corresponding the number of failed copies caused by the jam. This work is very troublesome.

There are some occasions wherein copy sheets are jammed while copying plural both-side documents or copying is desired to be discontinued for some reasons. In such a case, a document is delivered once, and it is no problem to deliver without taking any action when copying the obverse side of the document but it is a problem to deliver the document without taking an action when copying the reverse side of the document because the delivered document may not be in the correct sequence of pages with other documents which have been delivered already and it is necessary to put them in correct sequence, which is troublesome.

SUMMARY OF THE INVENTION

The present invention has been devised taking into consideration the situation mentioned above and its object is to simplify the copying treatment for the shortage of copies caused by the copy sheet jamming that takes place during copying the reverse side of a both-side document. To attain the aforesaid object, when a jamming takes place while copying the reverse side of the document, the reverse side of the document is copied on all the copy sheets stored in the intermediate tray, wherein the copy sheets are already copied thereon the obverse side of the document, and then the document is turned over by the automatic document feeding device for the shortage copy sheets caused by the jam and the obverse side of the document is copied on aforesaid shortage copy sheets first and then the document is turned again for the copying of the reverse side thereof.

A further object of the invention is to provide an automatic document feeding device of the document-turnover type wherein the documents are always delivered in the correct sequence of pages when copying a plurality of both-side documents. In order to attain aforesaid object, it is so constituted that when a copying operation is stopped, the documents are to be delivered without taking any action during copying the obverse side of the document and the documents are to be turned and delivered during copying the reverse side of the document, or the documents are to be turned and delivered during copying the obverse side and the documents are delivered without taking an action during copying the reverse side of the document.

DESCRIPTION OF THE PREFERRED EMBODIMENT

The invention will be explained as follows referring to the drawings.

Figure 1:
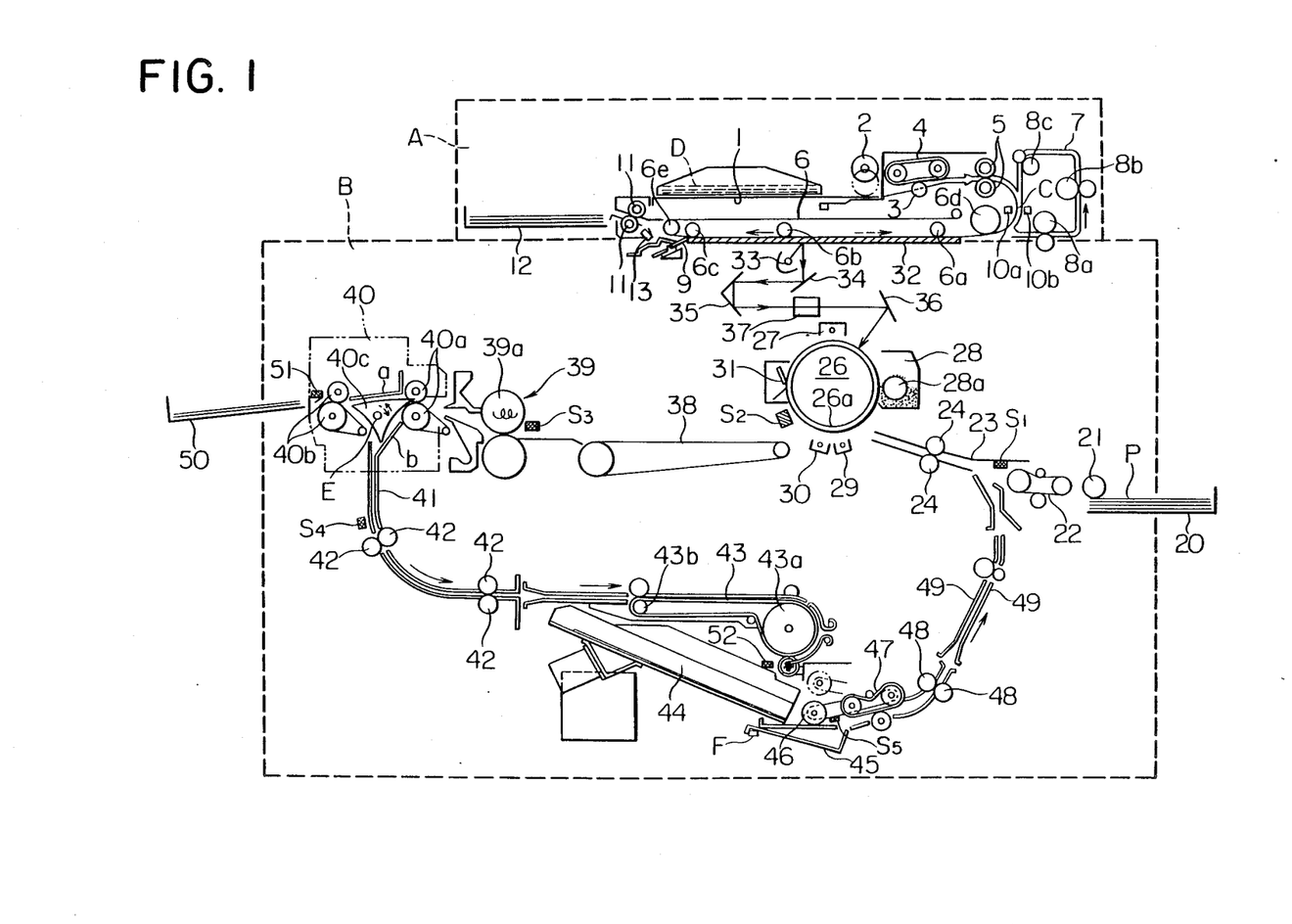
FIG. 1 represents a schematic diagram of an electrophotographic copying machine that performs a both-side copying through the method of both-side copying of the invention.

FIG. 1 shows a schematic diagram of an electrophotographic copying machine wherein a both-side copying is performed by the method of both-side copying of the invention and the area A enclosed with a dotted line is an automatic document feeding device of a document-turnover type and the area B is a body of a copying machine for both-side copying. The automatic document feeding device A is composed of document-loading plate 1 on which the documents are stacked, a document-feed-out roller 2 that feeds out only the uppermost document, conveyance belt 4 that conveys the document fed out in cooperation with double-feed-prevention roller 3, rollers 5 for document-feeding arranged along the document-feeding path, transport belt 6 that transports the conveyed document to the prescribed position on the document glass plate, document-turnover guide 7 and three pairs of transport rollers 8a, 8b and 8c, and pressure rollers 6a, 6b and 6c along the transport belt 6 are arranged. This transport belt 6 is driven by driving roller 6d and its movement direction between 6d and 6e is changed to the normal direction shown by an arrow of solid line or to the reverse direction shown by the dotted line arrow. In the vicinity of one end of the transport belt 6, there is provided stopper 9 that stops the transported document to the prescribed position on the document glass plate and this stopper 9 is driven electromagnetically, synchronizing with the feed timing for the document. The first document feeding path beginning from document-loading plate 1 to the fixed position on the document glass plate shares a common path at the section C with the second document feeding path along document-reversing guide 7 and in this common path C, there is provided a document detecting sensor at the passage of the document in which the document detecting sensor consists of light-emitting element 10a and photoreceptor element 10b. The notation 11 represents a document delivery roller that delivers the document which has been exposed, 12 is a document delivery tray accepting the delivered documents and 13 is a document delivery sensor that detects that the document has been delivered.

In this automatic document feeding device of a document-reversing type, each of document-feed-out roller 2, double feed prevention roller 3, conveyance belt 4, document-feeding roller 5, driving roller 6d for transport belt 6 and transport rollers 8a, 8b and 8c arranged along document-reversing guide 7 is driven by a common single document-feeding motor through a clutch or a gear, and among these rollers, driving roller 6d is caused by the change in the rotating direction of a motor to change its rotating direction but other rollers rotate in a one way direction through a reverse rotation mechanism independently of the direction of a motor rotation.

On the other hand, a copying machine body B for both-side-copying employing an electrophotographic process which has been known is provided under aforesaid automatic document feeding device A of a document-reversing type.

The notation 20 is a sheet-feeding cassette on which copy sheets P are stacked and loaded, 21 is feed-out roller that feeds out the uppermost copy sheet P, 22 is a sheet-feeding belt, 23 is a sheet-feed-guide plate, 24 is a sheet-feeding roller and 26 is a revolving drum having thereon a photoreceptor around which are arranged charging unit 27, developing unit 28, transfer unit 29, separating unit 30 and cleaning unit 31.

On the other hand. on the top of the copying machine body, is provided document glass plate 32 on which a document is to be placed at a predetermined position for the exposure and under that, are arranged exposure lamp 33, movable mirrors 34 and 35, fixed mirror 36 and lens 37.

The notation 38 is a transport belt that transports a copied sheet separated from revolving drum 26 after transferring to an image fixing part, 39 is a fixing unit and 40 is a switching device that switches the path for the copied sheet fixed in the fixing unit 39 to delivery path a or to reversing path b and the switching device is composed of 2 pairs of transport rollers 40a and 40b as well as of switching member 40c that rotates in the direction of an arrow around the center of the point E. The notation 41 is a guide plate that guides the sheet copied on its one side toward the intermediate tray, 42 is a transport roller, 43 is a reversing belt that reverses the copied sheet. 43a is a driving roller that drives reversing roller 43, 43b is a driven roller, 44 is an intermediate tray that accepts temporarily the one-side-copied sheets reversed by reversing belt 43, 45 is a true-up plate that moves vertically around a fulcrum F synchronizing with a copying operation and trues up the leading edges of copied sheets contained in tray 44, 46 is a sheet-feeding roller that moves vertically synchronizing with a copying operation and feeds out the uppermost copied sheet in copied sheets contained in intermediate tray 44, 47 is a sheet-feeding belt, 48 is a transport roller and 49 is a sheet-feeding guide.

Incidentally, 50 is a sheet delivery tray accepting copied sheets delivered after the changeover of switching device 40, 51 is a sheet delivery sensor that is arranged in the vicinity of the copied sheet outlet of the copying machine body B and 52 is an intermediate tray sensor arranged in the vicinity of transport belt 43 and detects the trailng edge of a copy sheet received in intermediate tray 44 after being copied on its one side.

Figure 2:
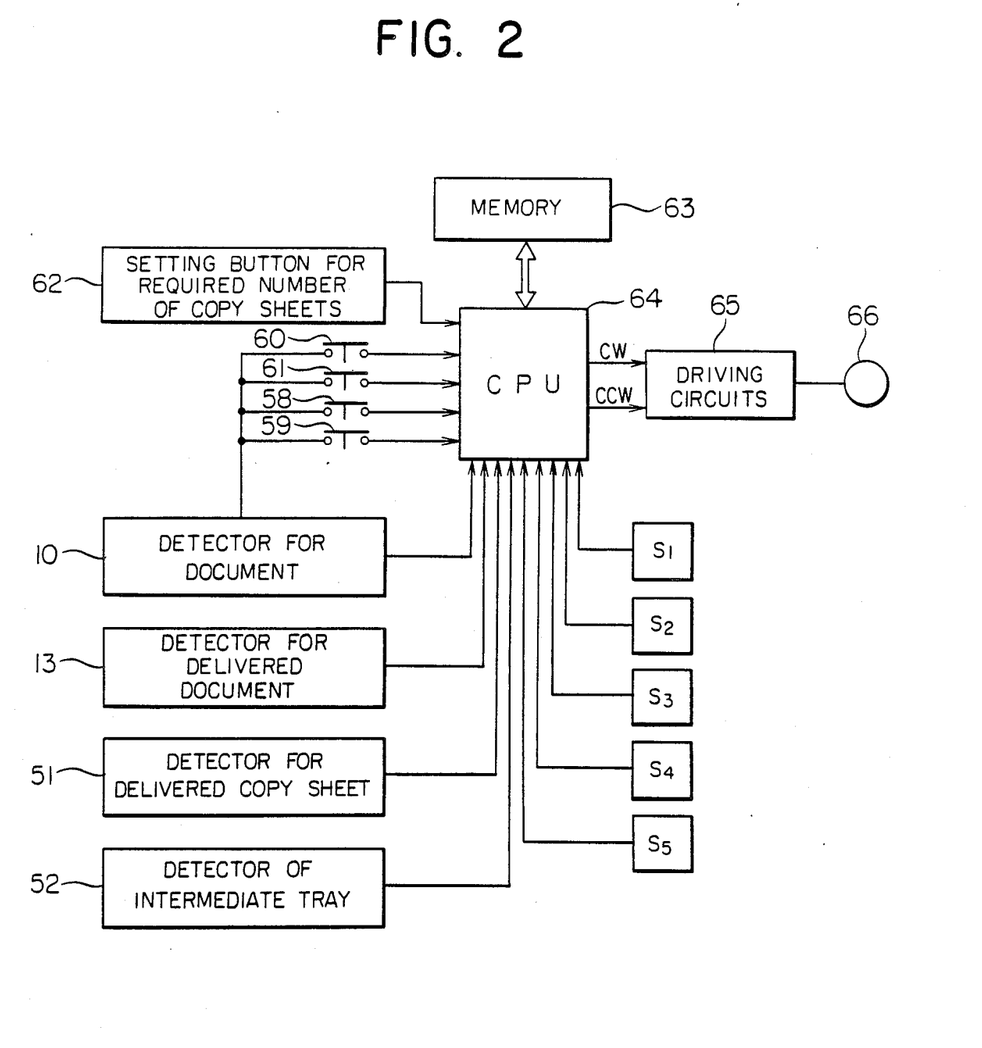
FIG. 2 is a block diagram of a control circuit for the turnover of a document in the electrophotographic copying machine shown in FIG. 1.

FIG. 2 represents a block diagram of a document-feed-control circuit for conducting the both-side copying of the invention.

In the diagram, 60 is a copy-start button to be turned on when starting copying, 61 is a both-side document button to be turned on when copying a both-side document, 58 is a both-side-copying button to be turned on when copying on both sides of a copy sheet and 59 is a copy-stop button to be turned on when suspending a copy operation or clearing the required number of copied sheets once set. The notation 62 is a setting button for required number of copied sheets to be copied consisting of ten keys with which the number of copied sheets required is set, 10 is a detector for document consisting of light-emitting element 10a and photoreceptor element 10b both shown in FIG. 1, 51 is a sheet delivery sensor appearing also in FIG. 1 and 52 is an intermediate tray sensor. The notation 63 is a memory in which the state of copy-start button 60, both-side document button 61, both-side-copying button 58 and copy-stop button 59, the required number of copied sheets set on setting button 62 and the state of sheet delivery sensor 51 are temporarily stored. 64 is a CPU that judges from the data stored in memory 63 in accordance with predetermined operation program, whether an obverse side of the document is being copied or a reverse side is being copied and whether the copying mode is one-side copying or both-side copying on a copy sheet and thereby outputs the command for reversing or delivering operation for the document and the copy sheet, and 65 is a driving circuit that drives document-feed motor 66 which drives various rollers and driving roller 6d for transport belt 6 through clutches and gears as stated above. Incidentally, copy-start button 60, both-side document button 61, both-side-copying button 58, the copy-stop button, setting button for required number of copied sheets 62, sheet-deliVery sensor 51, memory 63, CPU 64 and driving circuit 65 are all provided on the copying machine side but CPU 64 controls both the document-feeding sequence of the automatic document feeding device and the sequence of the electrophotographic process in the copying machine body.

The both-side copying operation of the invention will be explained next. Incidentally, the following description refers to the occasion wherein image informations printed on both sides of a both-side document are copied on both sides of a copy sheet.

In the ordinary both-side copying operation, a plurality of both-side documents to be copied are placed on document-loading plate 1 in the order of pages with their odd number pages up and both-side document button 61 and both-side-copying button 58 are pressed to made copy mode being both-side-copying mode while setting the required number of copied sheets with setting button for required number of copied sheets 62. Setting is not necessary when the required number is one. CPU 64 confirms the mode of reversing copy sheets and both-side documents for copying through the state wherein both-side document button 61 and both-side-copying button 58 are turned on and after that, when copy-start button 60 is turned on. document-feed motor 66 makes a regular turn and a series of rollers of the automatic document-feeding device rotate. Consequently. the uppermost document on document-loading plate 1 is fed out by document-feed-out roller 2 and transported to transport belt 6 after being fed by conveyance belt 4 and by feed rollers 5. When the leading edge of a dodument passes the position of document-detecting sensor 10 composed of light-emitting element 10a and photoreceptor 10b during the document feeding, the output of photoreceptor 10b rises it's signal level. When stopper 9 has been actuated to be protruded synchronizing with the rise of output signal of document-detecting sensor 10 and when the set time interval t1 on the timer from aforesaid rise of the signal level set in CPU 64 has passed, document-feed motor 66 stops running. At this time, the leading edge of a document hits stopper 9 and is set at the predetermined position on document glass plate 32. At this time, the obverse side corresponding to odd number page side of a document is facing downward in this preferred example. After that, an electrophotographic process starts as a first side copying step.

Namely, the copying machine itself enters into its preparation state for the electrophotographic process, thus revolving drum 26, developing sleeve 28a and heating roller 39a of fixing unit 39 rotate and transport belt 38 starts moving and the heater of heating roller 39a is concurrently energized.

After the prescribed time period, a series of an electrophotographic process beginning with the exposure on document by means of the optical scanning system starts. Thus, the visible image formed on photoreceptor 26 is transferred on copy sheet P fed out from sheet-feeding cassette 20 and then is fixed by fixing unit 39. Slightly before the foregoing, switching member 40c is turned around point A toward the direction of a solid line arrow by unillustrated switching means employing a solenoid and others, corresponding to the state that both-side-copying button is on an ON mode, therefore, a one-side-copied sheet, after fixing, proceeds on reversing path b and is led to guide plate 41 being transported by transport roller 40a and is further transported by transport roller 42 to be put on reversing belt 43. A copied sheet transported by reversing belt 43 is temporarily stored in intermediate tray 44 immediately after being reversed. The similar one-side-copying is performed on copy sheets in the quantity set on setting button for required number of copied sheets and all of them are stored in intermediate tray 44. A one-side-copied sheet to be stored in intermediate tray 44 is detected by intermediate tray sensor 52 immediately before being stored.

CPU 64 counts output signals from intermediate tray sensor 52 and when the counted value becomes equal to the number of copied sheets set by setting button for required number of copied sheets 62, the number is stored in memory 63, CPU 64 judges that the copying mode for obverse side of document is completed and outputs the signal CCW for reverse turning of motor to driving circuit 65, corresponding to the state wherein both-side document button 61 is ON mode. Consequently, document-feed motor 66 makes a reverse turn and the document which has been staying at the predetermined position is transported by transport belt 6 in the direction, directed by dotted line arrow, opposite to that for feeding and thus led to the reversing section. The document is transported through document-reversing-guide 7 by transport rollers 8a, 8b and 8c in the direction of an arrow. The time for reversing operation is counted by the timer incorporated in CPU 64 and when the set time t2 has passed, the output of regular turn signal CW for the motor is made. replacing the signal CCW for reverse turning of motor which has been outputted, thereby the rotation of motor is changed to the regular turn. At this time, the leading edge of the document reversed at the reversing section is in common path C or in its neighborhood and then it further advances and passes the position of document-detecting sensor 10 and reaches transport belt 6 which keeps transporting the document toward the predetermined position for the exposure of document on document glass plate 32. In the same way as the occasion of aforesaid setting of obverse side of document, document-feeding motor 66 stops running when set time t1 on the timer from the rise of output of document-detecting sensor 10 has passed. At this time, the document is staying at the predetermined position on document glass plate 32 being stopped and held by stopper 9 with the reverse side of the document facing downward.

After that, a series of electrophotographic processing as a second side copying step are made for the reverse side of the document. Namely, the exposure on the reverse side of document is made by the optical scanning system, an electrostatic latent image of the reverse side of the document is formed on photoreceptor 26a and it is developed by developing unit 28.

On the other hand, one-side-copied sheets stored in intermediate tray 44 are fed out beginning with the uppermost sheet by sheet-feeding roller 46, synchronizing with the timing of aforesaid electrophotographic process and are transported by sheet-feeding belt 47. A one-side-copied sheet is transported along guide plate 49 by transport-roller 48 and others to the transfer position where a visible image on the reverse side of the document formed on revolving drum 26 is transferred.

Thus, the both-side-copied sheet is transported by transport belt 38 to the fixing position where the both-side-copied sheet is fixed by the fixing unit 39. Since, at this time, switching member 40C of switching device 40 is already switched to the direction of a dotted line direction, the copied sheet to be transported by transport rollers 40a and 40b is delivered from the sheet delivery outlet of the copying machine body through delivery path a and is accepted on sheet delivery tray 50. At this time, the delivery of the copied sheet is detected by sheet delivery sensor 51.

An exposure for the reverse side of a document is made by an optical scanning system in the prescribed timing and at the same time the sheet feeding for one-side-copied sheet is made from intermediate tray 44 synchronizing with a copying operation, thus, the reverse side copying for each copied sheet is made. When the last copied sheet stored in intermediate tray 44 is fed and is delivered after the reverse side copying thereon, CPU 64 judges that the both-side copying has been finished and gives an output of motor-reverse-turn signal CCW to driving circuit 65 because the counted value for the output from sheet delivery sensor 51 agrees with the required number of copied sheets set by setting button for required number of copied sheets 62. Consequently, document-feed motor 66 makes a reverse turn which conveys the copied document to the reversing section where the copied document is reversed and then it is delivered by the regular turn of sheet-feed motor 66 and the output from document delivery sensor 13 causes a next document to be fed.

The foregoing is a normal both-side-copying operation. An operation to be made when a jam takes place during the reverse-side copying related to the present invention will be explained next referring to the flow chart shown in FIG. 3.

Inside copying machine body B, there are arranged a plurality of sensors along the copy sheet conveyance path. They are hatched squares $S_1 \sim S_5$ shown in FIG. 1, namely, sensor $S_1$ provided at the position where a copy sheet fed out from sheet-feeding cassette 20 is advanced after waiting temporarily, sensor $S_2$ provided at the separation position for the purpose of detecting the copy sheet wound around revolving drum 26, sensor $S_4$ provided in the vicinity of the entrance to fixing unit 39, sensor $S_4$ provided on the half way of guide plate 41 in the lower course of switching device 40, aforesaid both sheet delivery sensor 51 and intermediate tray sensor 52, and sensor $S_5$ provided on the outlet side of intermediate tray 44. Either one of those sensors detects a jam of a copy sheet.

Figure 3:
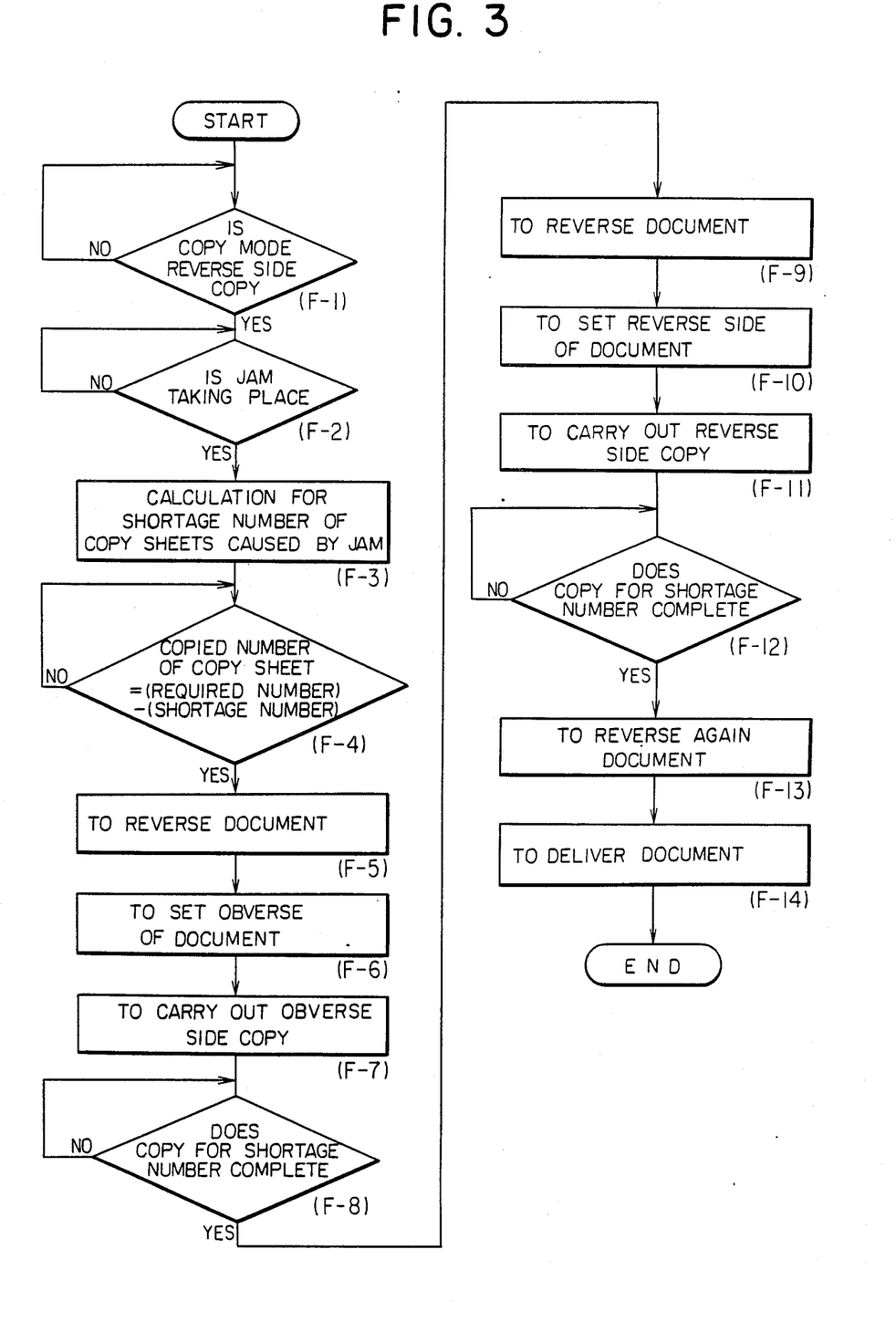
FIG. 3 is a flow chart of a copying operation after the occurrence of a jam and FIG. 4 is a flow chart of a document delivery action of the invention.

CPU 64 in a copying machine judges, as stated above, whether the machine is in a mode for copying the reverse side of a document or not from the coincidence of a counted value for the output from intermediate tray sensor 52 and the required number of copied sheets set by setting button for required number of copied sheets 62 (F-1). CPU 64 further can judges the copying step being on either the obverse side copying or the reverse side copying from the counted value of the output signal of document-detecting sensor 10. When a jam takes place during the reverse side copying (F-2), the warning for jam occurrence is displayed on the operation section on the top of the copying machine and at the same time, CPU 64 can judge the location of a jam occurrence depending on the specific sensor detecting the jam, thereby can identify the shortage of copied sheets caused by the jam occurrence (f-3). After counter operation for sheet jamming trouble such as by removing jammed sheet and pressing the copy-start button 60 again, the reverse side copying is resumed as a primary copying operation. During this reverse side copying it is judged by CPU 64 that whether the counted value for the output from sheet delivery sensor 51 agrees with the number of sheets which is the required number of copied sheets less the shortage number caused by a jam (F-4) or not. When they agree, it is judged that the reverse side copying mode has been completed, thus, the copying operation for the shortage number is started.

In high-speed copying machines, a plurality of copy sheets are sometimes in the various steps of electrophotographic process in the copying machine at the same time for the purpose of increasing the copy speed, and all of these copy sheets are sometimes wasted due to the jam occurrence.

Therefore, when copy-start button 60 is pushed again after clearing jammed sheets, one-side-copied sheets remaining in intermediate tray 44 are successively fed out and all of them are subjected to the reverse-side copying as stated above and are delivered in succession.

In this case, sensor $S_5$ provided at the outlet of intermediate tray sensor 52 detects that no one-side-copied sheet is remaining in intermediate tray 44 and thereby the completion of the reverse-side copying mode is confirmed (F-4) and then from the counted value for the output from sheet-delivery sensor 51 and the set required number of copied sheets, the shortage number of copied sheets caused by jam occurrence may be recognized (F-3). Next, upon completion of the reverse-side copying mode, secondary copying operation described hereinafter is carried out to supplement the shortage number caused by the jam trouble. CPU 64 produces an output of motor-reverse-turn signal CCW, thereby document-feed motor 66 makes a reverse turn, thereby, the document on document glass plate 32 is transported by transport belt 6 and then is reversed by transport rollers 8a, 8b and 8c (F-5). At the stage where the document is mostly reversed, CPU 64 stops producing motor-reverse-turn signal CCW and produces an output of motor-regular-turn signal CW. Consequently, document-feed motor 66 is switched to turn regularly and the direction of a movement of transport belt 6 is changed to that of an arrow of a solid line. When the time period $t_1$ has passed from the moment when the leading edge of a reversed document passed the position of document-detecting sensor 10, regular-turn signal CW from CPU 64 stops and thereby document-feed motor 66 stops running. At this time. the document is set at the predetermined position on document glass plate 32 with its obverse surface facing downward (F-6). After that, the copying operation for the obverse side of the document is started (F-7). The explanation of aforesaid copying operation will be omitted because it is identical to the operation for aforesaid normal obverse-side copy mode, and the copying is repeated for the number of shortage of copied sheets caused by a jam detected by step (F-3). The copied sheets corresponding to aforesaid shortage in number on which the obverse-side copying is finished (F-8) are stored temporarily in intermediate tray 44. When intermediate tray sensor 52 has detected the last copied sheet of aforesaid shortage number being put in intermediate tray 44, an output of motor-reverse-turn signal CCW is made from CPU 64 and document-feed motor 66 makes a reverse turn. The document-reversing operation thereafter is identical to the occasion of aforesaid normal both-side copying mode (F-9). After document-reversing, when the document is set on document glass plate 32 with its reverse side facing downward (F-10), the reverse-side-copying mode is started. A series of electrophotographic processing is made for the reverse side of a document and the copying is made on each reverse side of documents having their obverse sides copied and stored in intermediate tray 44 (F-11).

After the completion of both-side copying (F-12) for copy sheets corresponding to the shortage number caused by a jam, when a delivery for the last copied sheet is detected by sheet delivery sensor 51, an output of motor-reverse-turn signal CCW is made from CPU 64 and the document on document glass plate 32 is conveyed by transport belt 6 to the reversing section where the document is reversed again (F-13) and passes through the surface of document glass plate 32 again and is delivered (F-14).

As stated above, when a jam takes place during the copying operation for the reverse side of a document in the both-side copying mode wherein copying is made from a both-side document onto both sides of a copy sheet, the document is automatically reversed and both-side copying for the shortage number of copies caused by a jam is made.

In aforesaid example, when a jam takes place during the copying operation for the reverse side of a document, the primary copying operation to made first wherein the reverse side of a document is copied on all of the copied sheets which are copied on their obverse sides and stored in the intermediate tray and the secondary copying operation is made thereafter wherein the document is reversed for the copying of its obverse side as the first side copying step for the shortage number of copy sheets caused by a jam and then the document is reversed again as the second side copying step for the copying of its reverse side, but in the present invention, it is also possible that aforesaid secondary copying operation is made first and the primary copying operation is made later. However, since plural copy sheets, instead of one, tend to be caught by sheet-feed rollers in the intermediate tray after entering the state of sheet-feeding, it is preferable that aforesaid primary copying operation is made first and then the secondary one is made, for the reasons that less trouble is expected when obverse-side-copied sheets remaining in the intermediate tray are fed out quickly and it is convenient for the following operations that the number of both-side-copied sheets is learnt quickly for the calculation of the shortage number.

Next, there will be given an explanation for the occasion wherein a jam occurs while CPU 64 of the copying machine is judging from the counted value for the output from intermediate tray sensor 52 and the number of copies set by setting button for required number of copied sheets 62 that the machine is in the mode of obverse-side copying. In this case, when copy-start button 60 is depressed again after clearing the jam, the reverse-side copying is started, namely, the document is conveyed by transport belt 6 to the reversing section where the document is reversed and then is placed with its reverse side facing downward at the predetermined position on document glass plate 32 for the primary copying operation.

After that, one-side-copied sheets stacked in intermediate tray 44 are fed successively for their reverse-side copying and are delivered, thus the both-side-copied sheets are counted through the output from sheet delivery sensor 51. Sensor S5 provided at the exit of intermediate tray 44 or intermediate tray sensor 52 detects that no one-side-copied sheet is remaining in intermediate tray 44 and the shortage number of copied sheets on that occasion is calculated from the delivered copied sheets and the number of copied sheets set by setting button for required number of copied sheets 62. After that, the document is reversed again for the secondary copying operation so that its obverse side faces downward and then is placed on document glass plate 32 for the both-side copying for the shortage number of copied sheets.

Or, when a jam occurs during the mode of obverse-side copying, the location of the jam is brought to light by the sensor that has detected the jam and the shortage number of copied sheets caused by the jam is calculated as well, thereby, when copy-start button 60 is pushed again after clearing the jam, the obverse-side copying is continued for the shortage number of copied sheets, or the obverse-side copying is carried out until the counted value of intermediate tray sensor 52 becomes identical to the number of copied sheets set by the setting button 62 for required number of copied sheets. After that, it is also possible to deal with the occurrence of a jam during the obverse-side copying by moving to the reverse-side copying after transporting the document to the reversing section and then placing it at the predetermined position on document glass plate 32 with its reverse side facing downward.

Aforesaid example is for the both-side copying, while, when copying on one side of a copy sheet, the state wherein both-side-copying button 58 is in the mode of OFF causes CPU to discriminate that the mode is for the one-side copying. Thereby, switching member 40c swings around point E in the direction of an arrow of a dotted line, which causes copied sheets to be delivered to sheet delivery tray 50 through delivery path a without being conveyed to intermediate tray 44. On the occasion of jam occurrence during the one-side-copying for aforesaid copy sheets, when copy-start button 60 is pushed again after clearing the jam regardless of the copying of the obverse side or the reverse side of the document, the document state at the moment of the jam occurrence is continued and the copying is carried out until the number of copied sheets set by setting button for required number of copied sheets 62 becomes identical to the counted value of the output from sheet delivery sensor 52.

Next, document-delivery actions performed when a copy-stop button 59 is pushed will be explained referring to the flow chart in FIG. 4.

Figure 4:
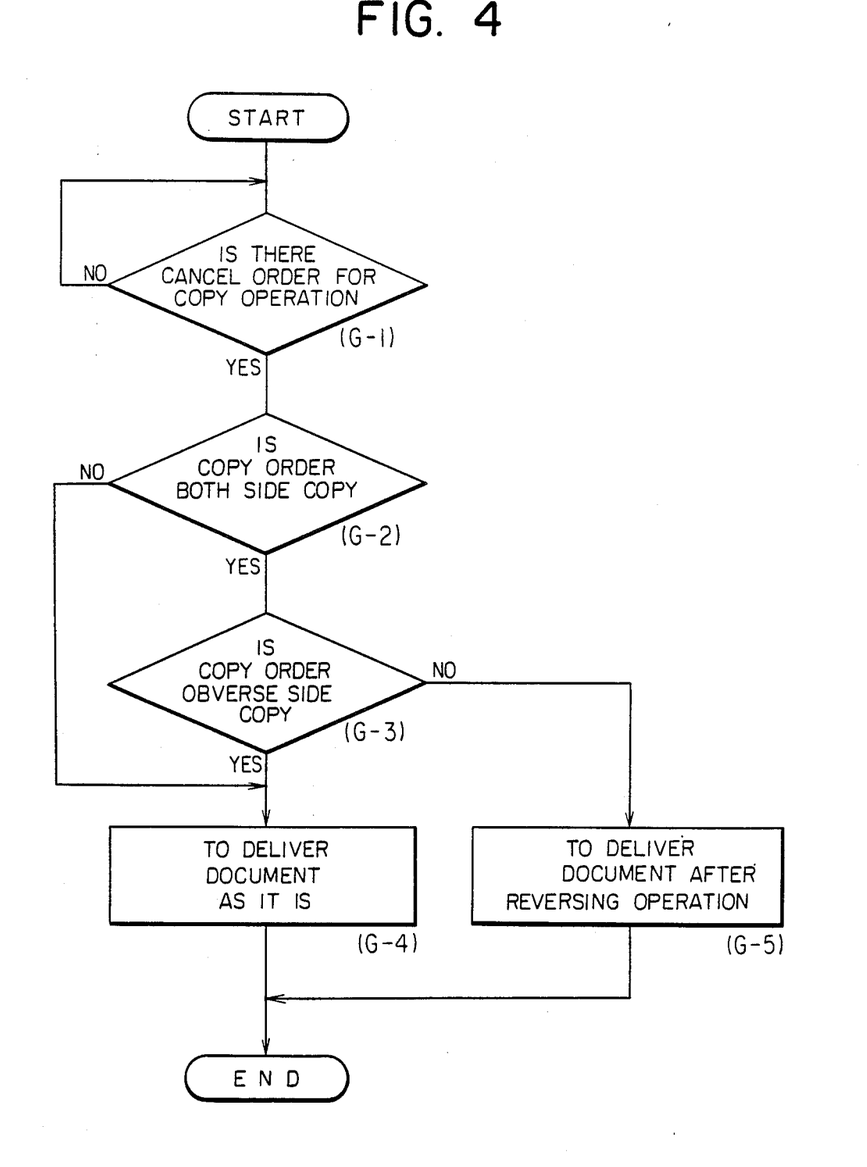

As is shown in FIG. 4, CPU 45 is always discriminating whether copy-stop button 59 is actuated or not (G-1), and when the copy-stop button is being actuated, CPU 45 discriminates whether both-side documents are being copied or not through the state of ON or OFF of both-side document button 61 (G-2). When it is discriminated that both-side documents are not being copied, the documents may be delivered without taking any action because one-side documents are being copied then, but when both-side documents are being copied, it should be discriminated whether the obverse side of a document is being copied or the reverse side thereof is being copied (G-3). This discrimination is made as follows. Namely, the required number of copied sheets is set before copying by setting button for required number of copied sheets 62 and data of the required number of copied sheets is stored in memory 63. Therefore, it is possible to discriminate whether the obverse side of a document is being copied or the reverse side thereof is being copied with the counted value and the data of required number of copied sheets if CPU 64 is counting the output signals from intermediate tray sensor 52 when copying on both sides of a copy sheet, namely, when both-side-copy button 59 is on the mode of ON and if CPU 64 is counting the output signals from sheet delivery sensor 51 when copying only on one side of a copy sheet, namely, when both-side-copy button 59 is on the mode of OFF.

When it is discriminated that the obverse side is being copied, copy-stop-button 59 is actuated to be ON and at the same time, the output of stopper-functioning signal from CPU 64 is discontinued and the output of regular-turn signal CW for the motor is made. As a result, stopper 9 which has been in lifted position until that time gets out of the path and document-feed motor 66 makes a regular turn. Thus, the document is delivered without being reversed (G-4) and document-feed motor 66 is stopped with the timing of the fall of output signals from document-delivery sensor 13.

In contrast with the foregoing, when it is discriminated in step (G-3) that the reverse side of a document is being copied, copy-stop-button 59 is actuated to be ON and at the same time, stopper 9 is caused by the command from CPU 64 to get out of the path and document-feed motor 66 makes a reverse turn. Thereby, transport belt 6 moves in the direction opposite to that for document-feeding, thus, the document is conveyed to the reversing section where the document is reversed (G-5). Document-feed motor 66 is switched to the regular turn after a prescribed period of time and the reversed document is delivered by transport belt 6. The timing of the fall of output signals from document-delivery-sensor 13 stops document-feed motor 66.

As is stated above, a document is delivered without being reversed when the obverse side of the document is being copied, while the document is delivered after being reversed when the reverse side thereof is being copied. Thereby, the obverse side of a document faces downward and the reverse side thereof faces upward, therefore, an order of pages of documents delivered agrees totally with that of documents delivered previously in document-delivery tray 10. In aforesaid example, is illustrated an occasion wherein a copy-stop action was made during the copying operation and it is further possible to deal with similarly the occasion wherein a copy sheet is jammed in a copying machine body. The reason for the foregoing is that it is possible to increase the copying speed for copying on one side of a copy sheet from that for copying on both sides thereof in the invention and in the case of this one-side copying, the document is delivered before the copied sheet finished with an electrophotographic processing thereon is still staying in the copying machine body without being delivered and next document can be fed or set for the purpose of increasing the copying speed. In such a case, when a jam takes place on a copied sheet finished with an electrophotographic processing, the document set in that moment should be delivered temporarily. Further, aforesaid example may be applied to both the occasion for copying a both-side document on one side of a copy sheet and the occasion for copying the same on both sides of a copy sheet. Further, when a document is placed on a document glass plate of an automatic document feeding device, it is also naturally possible to place the document with its even page up. The present invention is not limited to the example stated above but is capable of being applied to various kinds of variations. In the aforesaid example, for instance, when the copying operation is stopped, a document is delivered without being reversed for copying the obverse side of the document, while a document is delivered after being reversed for copying the reverse side of the document, but in contrast with the foregoing, the document may be delivered after being reversed for copying the obverse side of the document, while the document may be delivered without being reversed for copying the reverse side of the document.

Further, in the aforesaid example, a document-reversing section is located at the position that is opposite to the document-delivery side with respect to the document glass plate but the invention is not limited to this and the document-reversing section may naturally be located at the document-delivery side. Further, a document-reversing means may be the so-called switch-back type one instead of above-mentioned means wherein the document is reversed while being transported in the reversing guide by reversing rollers.

In the present invention, as stated above, when a jam takes place while the reverse side of a document is being copied in the both-side copying system wherein an automatic document-feeding device having a document-reversing function is used and both-side copying is made from a both-side document, the first copying process wherein the reverse side of the document is copied on all the copied sheets which are in the intermediate tray and are finished with copying of the obverse side of the document and the second copying process wherein the document is first reversed by the automatic document-feeding device and the obverse side of the document is copied on the shortage number of copied sheets caused by the jam and then the document is reversed again and the reverse side thereof is copied, are carried out. Therefore, the required number of both-side copied sheets are automatically obtained without carrying out the troublesome work such as setting the document manually for the shortage number caused by the jam.

Further, because of the constitution of the invention wherein the document is delivered without being reversed for copying the obverse side of the document when the copying operation is stopped and the document is delivered after being reversed for copying the reverse side of the document, all the documents are always delivered in the same direction and they are in the right order of pages, which is convenient for the following handling. Therefore, it is not necessary to carry out the following work of putting the documents in correct order of pages.

What is claimed is:

1. A method of copying images printed on both sides of document using an automatic conveying device capable of reversing the side of said document to be copied, which comprises:

feeding a document and a sheet to respective copying positions by respective conveying devices, a first side copying step of copying the image of a first side of the document onto the sheet, in which the copied sheet is delivered to a sheet delivery tray during one side copy mode copying the images onto only one side of the sheet or the copied sheet is stored into an intermediate tray during both side copy mode copying the images onto both sides of the sheet, reversing the side of the document to be copied, a second side copying step of copying the another images of a second side of the document onto a fresh sheet during the one side copy mode or onto other side of the one side copied sheet fed from the intermediate tray during the both side copy mode, delivering the document and the copied sheet to respective delivery trays, and controlling the copying step while judging whether the copying step is the first side copying step or the second side copying step and whether the copy mode is the one side copy mode or the both side copy mode.

2. The method of claim 1, wherein said controlling step comprises counting a shortage number of sheets caused by jamming trouble during copying the image of document onto a plurality of sheets.

3. The method of claim 2, wherein, after a counting operation for sheet jamming trouble, said method further comprises resuming the copying step in accordance with the controlling step.

4. The method of claim 3, wherein, after the counting operation for sheet jamming trouble during the both side copy mode, said resuming step comprises;

a primary copying operation carring out the second side copying step onto the other side of the one side copied sheet stored into the intermediate tray, and a secondary copying operation to supplement the shortage number counted at the judging step.

5. The method of claim 4, wherein, after the counting operation for sheet jamming trouble during the second side copying step, said resuming step carries out firstly the primary copying operation and then the secondary copying operation so that the copying step is resumed for the one side copied sheet while keeping the document being the second side, thereafter the document is reversed to be copied the first side thereof and then the first side copying step and the second side copying step are carried out in order onto fresh sheet to supplement the shortage number.

6. The method of claim 4, wherein, after the counting operation for sheet jamming trouble during the second side copying step, said resuming step carries out firstly the secondary copying operation and then the primary copying operation so that firstly the document is reversed to be copied the first side thereof and then the first side copying step is carried out onto fresh sheet to supplement the shortage number, thereafter the document is reversed again and then the second side copying step is carried out onto the one side copied sheet.

7. The method of claim 4, wherein, after the counting operation for sheet jamming trouble during the first side copying step, said resuming step carries out firstly the primary copying operation and then the secondary copying operation so that firstly the document is reversed to be copied the second side thereof and then the second side copying step is carried out onto the one side copied sheet, thereafter the document is reversed again and then the first side copying step and the second side copying step are carried out in order onto fresh sheet to supplement the shortage number.

8. The method of claim 4, wherein, after the counting operation for sheet jamming trouble during the first side copying step, the copying step is resumed for fresh sheet to supplement the shortage number while keeping the document being the first side, thereafter the document is reversed and then the second side copying step is carried out onto the one side copied sheet.

9. The method of claim 1, wherein when a copy-stop order is inputted during the second side copying step, the method further comprises reversing the document and then delivering the document, and when a copy-stop order is inputted during the first side copying step, the method comprises delivering the document without the reversing step.

10. The method of claim 1, wherein when a copy-stop order is inputted during the first side copying step, the method further comprises reversing the document and then delivering the document, and when a copy-stop order is inputted during the second side copying step, the method comprises delivering the document without the reversing step.

11. A conveyance apparatus for conveying a document having images, comprising:

a feeding means for feeding the document to a copying position, a reversing means for reversing the side of the document to be copied, a delivering means for delivering the document to a delivery tray, and 1 a controlling means for judging which side of the document is being copied and for operating the reversing means and the delivering means in responsive to a copy-stop order so that the number of pages of the delivered document are kept in predetermined order.

12. The apparatus of claim 11, wherein when the copy-stop order is inputted and the controlling means judges the second side of the document being copied, the controlling means operates the reversing means to reverse the document and then operates the delivering means to deliver the reversed document, and when the copy-stop order is inputted and the controlling means judges the first side of the document being copied, the controlling means operates the delivering means to deliver the document without reversing.

13. The apparatus of claim 11, wherein when the copy-stop order is inputted and the controlling means judges the first side of the document being copied, the controlling means operates the reversing means to reverse the document and then operates the delivering means to deliver the reversed document, and when the copy-stop order is inputted and the controlling means judges the second side of the document being copied, the controlling means operates the delivering means to deliver the document without reversing.

* * * * *